United States Patent
Lee et al.

(10) Patent No.: US 8,120,734 B2
(45) Date of Patent: Feb. 21, 2012

(54) TRANSFLECTIVE LIQUID CRYSTAL DISPLAY AND FABRICATION METHOD THEREOF

(75) Inventors: Sang-Wook Lee, Gyeonggi-Do (KR); Ku-Hyun Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 180 days.

(21) Appl. No.: 11/952,824

(22) Filed: Dec. 7, 2007

(65) Prior Publication Data

US 2008/0192190 A1  Aug. 14, 2008

(30) Foreign Application Priority Data

Dec. 7, 2006  (KR) .................. 10-2006-0123999

(51) Int. Cl.
*G02F 1/1335* (2006.01)
(52) U.S. Cl. .................................... 349/114; 349/123
(58) Field of Classification Search .................. 349/114, 349/123
See application file for complete search history.

(56) References Cited

U.S. PATENT DOCUMENTS

| | | | | |
|---|---|---|---|---|
| 7,068,335 | B2 * | 6/2006 | Jang et al. | 349/114 |
| 7,123,319 | B2 * | 10/2006 | Broer et al. | 349/86 |
| 2003/0011729 | A1 * | 1/2003 | Song et al. | 349/107 |
| 2003/0052869 | A1 * | 3/2003 | Fujii et al. | 345/204 |
| 2006/0238679 | A1 * | 10/2006 | Hirai | 349/117 |
| 2007/0077371 | A1 * | 4/2007 | Dimitrakopoulos et al. | 428/1.1 |
| 2007/0216821 | A1 * | 9/2007 | Kim et al. | 349/38 |

* cited by examiner

*Primary Examiner* — Eric Wong
(74) *Attorney, Agent, or Firm* — Birch, Stewart, Kolasch & Birch, LLP

(57) ABSTRACT

A liquid crystal display device having first and second substrates that face each other, a liquid crystal layer interposed between the first and second substrates, a thin film transistor (TFT) formed on the first substrate, and a pixel electrode electrically connected with the TFT and including a reflective portion having a reflective electrode and a transmissive portion having a transmissive electrode. Furthermore, the reflective electrode includes a conductive polymer material.

15 Claims, 3 Drawing Sheets

TRANSFLECTIVE LIQUID CRYSTAL DISPLAY AND FABRICATION METHOD THEREOF

This application claims priority to Korean Patent Application No. 10-2006-0123999 filed on Dec. 7, 2006 in Korea, the entire contents of which is hereby incorporated by reference in its entirety.

BACKGROUND OF THE INVENTION

1. Field of the Invention

The present invention relates to a transflective liquid crystal display (LCD) and more particularly, to a transflective LCD and corresponding manufacturing method capable of reducing misalignment (erroneous arrangement) of liquid crystals at an interface between a reflection portion and a transmission portion and improving a step coverage of the interface.

2. Description of the Related Art

Computer networks now allow users to connect and operate their laptop or other mobile device pretty much anywhere and at anytime. For example, users can connect to the Internet via a Web terminal, a mobile terminal, a personal digital assistance (PDA), etc. Further, the devices are also expected to display various information including still and moving images in color.

Also, the mobile devices are generally thin and light weight and tend to consume less power than standalone computing devices. In addition, a transmissive liquid crystal display (LCD) panel is generally used in the mobile devices. However, one problem with transmissive LCDs is that they require a backlight unit. That is, the power consumption of the backlight unit shortens the usage time of the mobile device and also adds to the thickness of the mobile device.

In an effort to overcome these problems, a reflective LCD has been proposed, which uses ambient light as a source of illumination. That is, the transmissive LCD including the backlight consumes about more than 70% of power than the reflective LOD. Further, because a backlight unit is not required in the reflective LCD, the mobile device can be made thinner and thus the weight of the device is also reduced.

However, the related art transmissive LCD has such low visibility that its color contrast is degraded by light reflection from a surface of a panel in bright environments. Further, the reflective LCD has a problem because natural light or ambient light such as an artificial light source does not always exist. That is, the reflective LCD may be used in an office or in a building in which external artificial light is provided, but cannot be used at night when natural light is not present.

Therefore, a transflective LCD has been developed that uses the advantages of the transmissive LCD and the reflective LCD. For example, FIG. 1 is an exploded perspective view showing a related art transflective color LCD. As shown in FIG. 1, the related art transflective LCD includes a second substrate 23 having a color filter 2 and a common electrode 18 (shown in FIG. 2) formed on a black matrix 44, and a first substrate 21 including a pixel electrode 3 having a transmissive portion (T) and reflective portions (R), a thin film transistor (TFT) 9, and array wirings 4 and 5. Further, liquid crystals 22 are filled between the second substrate 23 and the first substrate 21.

An operation of the transflective LCD with such a configuration will now be described with reference to FIG. 2, which is a sectional view of the related art transflective LCD. As shown in FIG. 2, the first substrate 21 having the TFT 9 and the second substrate 23 having the color filter 2 are disposed in a facing manner respectively on transparent substrates 11 and 16, and the liquid crystal layer 22 with liquid crystal injected thereto is interposed between the first and second substrates 22 and 23.

In addition, in the first substrate 21, the TFT 9, which is disposed at each pixel and applies or cuts off a signal voltage to or from the liquid crystal, is formed on the transparent substrate 11. Further, the TFT 9 includes a gate electrode 61 to which a scan signal is applied, and an active layer 62 including a semiconductor layer 62a made of amorphous silicon and activated according to the scan signal to form a channel and an ohmic contact layer 62b formed at both upper portions of the semiconductor layer 62a such that impurities are doped on the amorphous silicon. The TFT 9 also includes a gate insulating layer 60 that electrically separates the active layer 62 and the gate electrode 61, a source electrode 63 formed on the active layer 62 and receiving a data signal, and a drain electrode 64 applying the data signal input to the source electrode 63 to the pixel electrode 3 when the semiconductor layer 62a is activated.

Further, as shown, a passivation layer 27 for protecting the source electrode 63 and the drain electrode 64 is formed on the TFT 9 over the first substrate 21, and a contact hole 65 is formed at the passivation layer 27. Also, the common electrode 18 for applying voltage to the liquid crystal and the black matrix 44 for preventing light leakage are formed on the second substrate 28 corresponding to the region where the TFT 9 is formed.

In addition, a transparent electrode 17 is formed at a pixel region of each pixel, excluding the region where the TFT is formed, and is connected with the drain electrode 64 via the contact hole 65. A reflective electrode 12 made of metal with good reflectivity is also formed on the transparent electrode 17. Further, as shown, a portion of the reflective electrode 12 is removed to form the transmissive portion (T).

In addition, in a reflection mode of the transflective LCD, light incident from the exterior is reflected by the reflective portion (R) so as to be emitted to the exterior in a reflection mode, and in a transmission mode, light emitted from a backlight unit is transmitted through the transmissive portion (T) to thus display an image Further, as shown in FIG. 2, the passivation layer 27 at the region where the transmissive portion (T) is formed is removed to form a recess.

That is, the recess is formed to adjust an ON/OFF operation of the reflective portions (R) and the transmissive portion (T) and maximize the efficiency of the transmission mode. Further, in FIG. 2, a ratio of a cell gap (d2) of the transmissive portion (T) and (d1) of the reflective portions (R) is 2:1. That is, when the cell gap of the transmissive portion (T) is double the cell gap of the reflective portions (R) (i.e., d2=2d1), the highest transmission efficiency can be obtained at the reflective portions (R) and the transmissive portion (T).

However, because the TFT is formed on the first substrate 21, when the passivation layer is etched, the TFT is significantly affected that results in deficiencies and make the process complicated. In addition, after the etching process, the boundary surface of the passivation layer has a slope portion with a certain tilt Therefore, the liquid crystals aligned on the slope portion have a different arrangement from the liquid crystals aligned on the planar surface, which affect the arrangement of the liquid crystals formed on the planar surface adjacent to the slope portion.

This arrangement causes degradation of the contrast of a screen image in the transmission mode, and if the reflective portions extend to a portion of the flat transmissive portion (T) adjacent to the slope portion to avoid the degradation of contrast, an aperture ratio is reduced.

SUMMARY OF THE INVENTION

Accordingly, an object of the present invention is to address the above-noted and other problems.

Another object of the present invention is to provide a liquid crystal display (LCD) capable of enhancing a contrast ratio and uniformity of images by making a reflective portion and a transmissive portion of a pixel electrode have the same cell gap.

To achieve these and other advantages and in accordance with the purpose of the present invention, as embodied and broadly described herein, the present invention provides in one aspect a liquid crystal display device including first and second substrates that face each other, a liquid crystal layer interposed between the first and second substrates, a thin film transistor (TFT) formed on the first substrate, and a pixel electrode electrically connected with the TFT and including a reflective portion having a reflective electrode and a transmissive portion having a transmissive electrode. Further, the reflective electrode includes a conductive polymer material.

In another aspect, the present invention provides a method of fabricating a liquid crystal display device. The method includes forming first and second substrates, forming a thin film transistor (TFT) formed on the first substrate, and forming a pixel electrode to be electrically connected with the TFT. Further, the pixel electrode includes a transmissive portion having a transmissive electrode and a reflective portion having a reflective electrode including a conductive polymer material. The method also includes attaching the first and second substrates to face each other, and interposing a liquid crystal layer between the first and second substrates.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The liquid crystal display (LCD) and its fabrication method according to embodiments of the present invention will now be described with reference to the accompanying drawings.

To solve the problem of a reduced aperture ratio, the transmissive portion (T) and the reflective portions (R) may be formed to have the same cell gap and an alignment degree of liquid crystals is controlled by controlling the voltage applied to the transmissive portion (T) and the reflective portions (R).

However, forming the transmissive portion (T) and the reflective portions (R) with the same cell gap may improve the manufacturing process, but a transmission amount or a reflective amount changes according to voltages of the reflective portions (R) and the transmissive portion (T), making it difficult to stably display an image. Thus, an additional driving technique such as a dual gamma method is required, in which the reflective portions (R) and the transmissive portion (T) are driven separately with electrical signals.

In other words, two TFTs are formed at a single gate line and data is divided into two parts to apply each signal to the reflective portions (R) and the transmissive portion (T). Alternatively, a signal can be applied to a single data line and TFT with two gate lines to apply signals respectively to the reflective portions (R) and the transmissive portion (T). However, this method requires a complicated driving technique.

Figure 1:
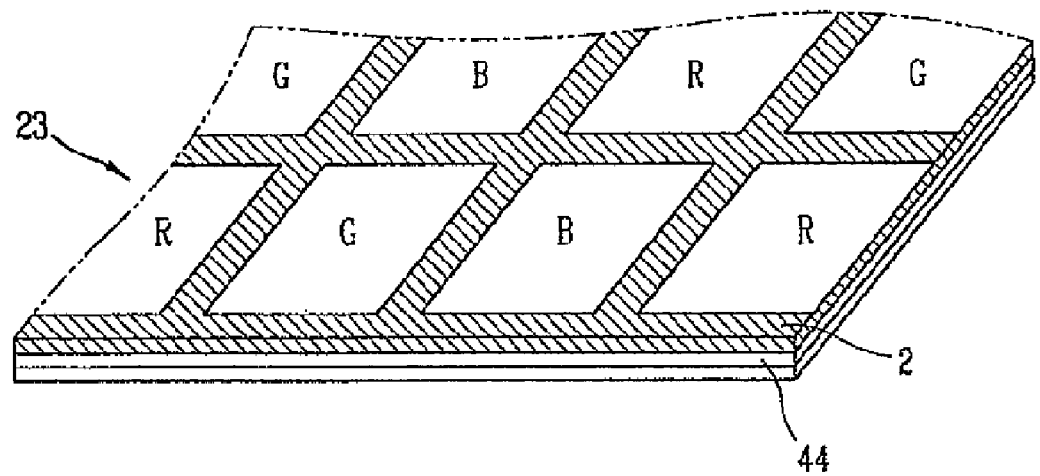
FIG. 1 is an exploded perspective view of a related art transflective color liquid crystal display (LCD)
Figure 1:
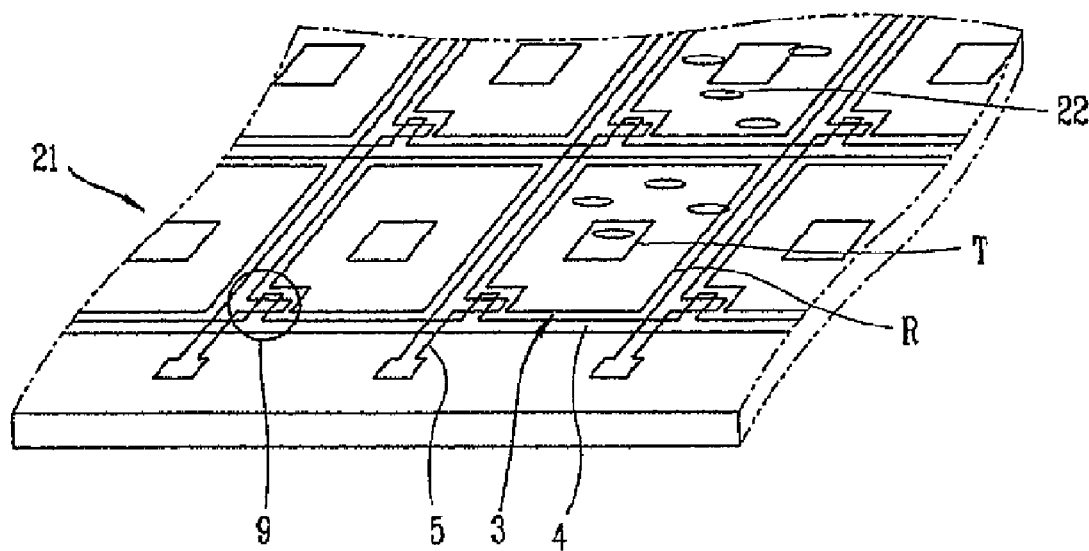
Figure 2:
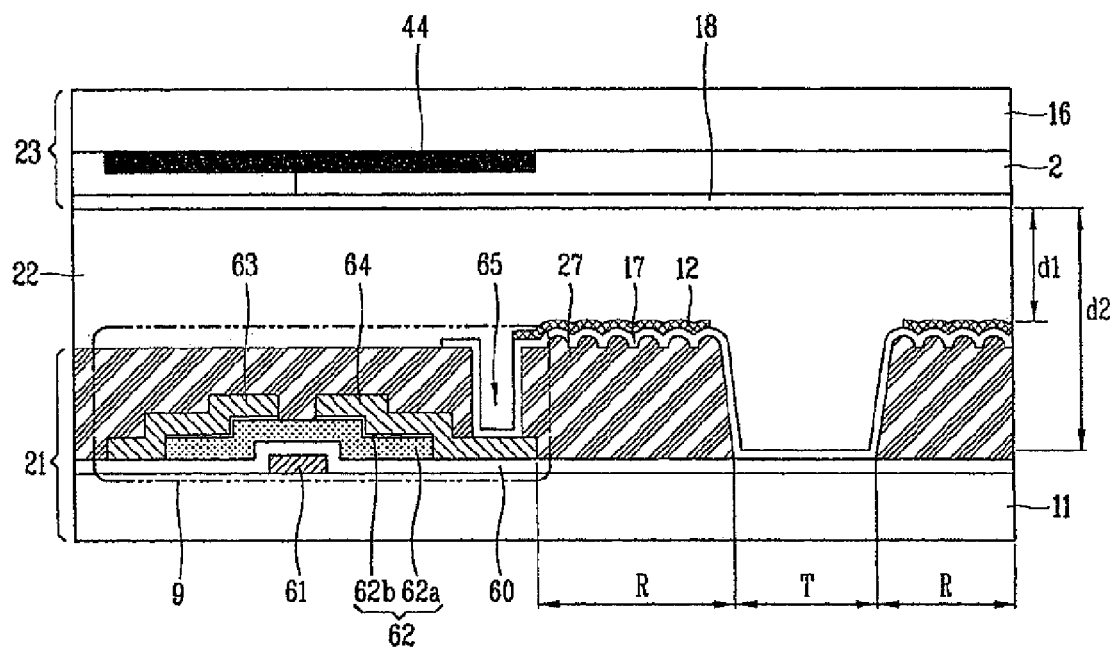
FIG. 2 is a sectional view of the related art transflective color LCD.
Figure 3:
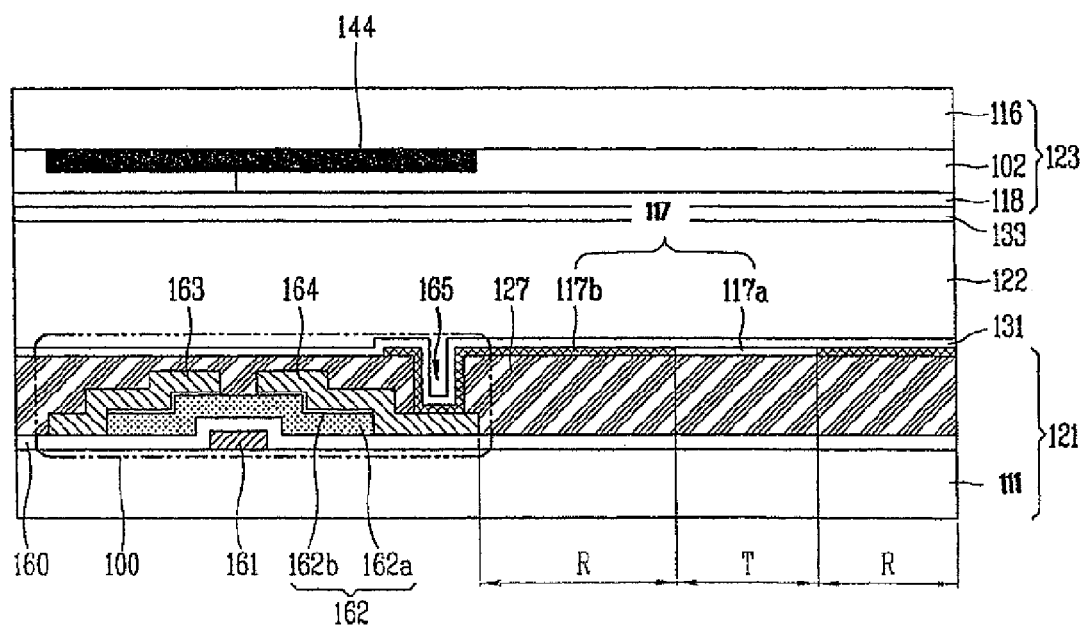
FIG. 3 is a sectional view of a transflective LCD according to a first embodiment of the present invention.

Another method of solving the problems with the related art transflective color LCD is illustrated in FIG. 3. That is, FIG. 3 is a sectional view of a transflective LCD according to a first embodiment of the present invention. As shown, the transflective LCD includes first and second substrates 121 and 123 that face each other, and a liquid crystal layer 122 provided between the first and second substrates 121 and 123. Further, a gate line (not shown) and a data line (not shown) cross each other to thereby define a pixel area on the first substrate 121.

In addition, a pixel electrode 117 is formed at the pixel area so as to apply an electric field to the liquid crystal layer 122, and a TFT 100 is formed at the crossing portion of the gate line and the data line to drive the pixel electrode 117 according to signals of the gate line and the data line. Also, the TFT 100 is disposed at each pixel and serves to apply a signal voltage to the liquid crystal layer 122 or to cut off or block the application of the signal voltage.

As shown in FIG. 3, the TFT 100 includes a gate electrode 161 to which a scan signal is applied, an active layer 162 including a semiconductor layer 162a made of amorphous silicon and activated according to the scan signal to form a channel and an ohmic-contact layer 162b formed at both upper portions of the semiconductor layer 162a such that impurities are doped on the amorphous silicon. The TFT 100 also includes a gate insulating layer 160 that electrically separates the active layer 162 and the gate electrode 161, a source electrode 163 formed on the active layer 162 and for receiving a data signal, and a drain electrode 164 for applying the data signal that has been input to the source electrode 163 to the pixel electrode 117 when the semiconductor layer 162a is activated.

In addition, a passivation layer 127 is formed at the upper portions of the source electrode 163 and the 164 over the substrate, and a contact hole 165 is formed at the passivation layer 127 such that the drain electrode 164 and pixel electrode 117 are electrically connected. Further, the pixel electrode 117 includes a transmissive electrode 117a made of a transparent material allowing light to be transmitted therethrough, and a reflective electrode 117b made of an opaque material to allow light from the exterior to be reflected therefrom. For example, the reflective electrode 117b may be made of a conductive polymer material.

In addition, as shown in FIG. 3, a black matrix 144 is formed on the second substrate 123 facing the first substrate 121 for preventing a light from leaking (a light leakage phenomenon) between pixels formed at a portion which correspond to the TFT 100 and the gate and data lines. Also, red, green and blue color filters 102 are formed between the black matrixes 144, and a transparent common electrode 118 is formed on the entire surface of the color filters 102. Further, alignment layers 131 and 133 are coated on the first and second substrates 121 and 123 in order to align liquid crystal molecules of the liquid crystal layer 122.

In addition, in one embodiment of the present invention, the transmissive electrode 117a and the reflective electrode 117b are each made of different materials to control an effective phase difference of the liquid crystals in the transmissive portion (T) and reflective portions (R). Namely, the two electrodes are made of different materials each having different physical properties such as electric conductivity, resistance and dielectric constant. For example, the reflective electrode 117b may be made of a conductive polymer. Further, the conductive polymer material may be metal-doped polyimide or a mixture of transition metal complex and polyimide.

Also, because the metal-doped polyimide assumes conductivity as a metallic material is doped on polyimide, the metal-doped polyimide can also be used as an electrode. Further, the transition metal complex has a paramagnetic property at a high spin stat, assuming conductivity, so the transition metal can be used as an electrode. Triazole may also be used as ligand, and by introducing alkyl group to triazole molecules, compatibility with polyimide used for forming the alignment layers can be improved.

Further, the physical properties such as conductivity of the polymer material can be controlled by changing a doping amount of metal, using a different central metal or by changing the structure of complex. In addition, the reflective electrode can be formed with the polymer material such as polyimide, the material of the alignment layer, and thus can be used as the alignment layer. An example of using the reflective electrode as the alignment layer will be described later.

Meanwhile, the transmissive electrode 117a is made of a transparent conductive material such as ITO (Indium Tin Oxide), IZO (Indium Zinc Oxide), or the like, and the reflective electrode 117b is made of an opaque conductive material with a good reflexibility. In addition, because the physical properties of the electrode materials each constituting the reflective portions (R) and the transmissive portion (T) are different according to an embodiment of the present invention, when a voltage is applied, each effective voltage that may be substantially affected by liquid crystals on the reflective portions (R) and the transmissive portion (T) is different to thus vary an amount of rotation of the liquid crystals.

Accordingly, a phase difference of light transmitted occurs through the reflective portions (R) and the transmissive portion (T). In particular, the reflective electrode 117b made of the polymer conductive material defers a phase difference of light passing through the liquid crystal layer of the reflective portion (R) to make the phase of the light the same as that of the light passing through the transmissive portion (T).

Thus, by forming the reflective electrode 117b of the reflective portion (R) with the conductive polymer material, the phase difference of the reflective portion (R) and the transmissive portion (T) can be separately controlled, thereby allowing a single gamma driving operation to be used to drive the reflective portion (R) and the transmissive portion (T) with a single signal. Accordingly, although the cell gap of the transmissive portion (T) is the same as that of the reflective portion (R), the phase of light that passes through the reflective portion (R) and the transmissive portion (T) can be controlled to be the same.

Further, the reflection amount of light (V-R, Voltage-Reflection) according to the voltage applied to the reflective electrode 117b preferably has a similar value or the same value as the transmission amount of light (V-T, Voltage-Transmittance) according to the voltage applied to the transmissive electrode 117a. Also, when the V-R and V-T characteristics of the two electrodes 117a and 117b are substantially the same, each amount of light displayed when the same voltage is applied to the two electrodes 117a and 117b becomes substantially the same, thereby obtaining a uniform luminance, and the reflective portion (R) and the transmissive portion (T) can be operated simultaneously through a single driving operation.

In addition, to minimize the difference of the light path of the transmissive portion (T) and the reflective portions (R), the transmissive electrode 117a and the reflection electrode 117b may have the same thickness. In this instance, the thickness of a partial contact portion of the transmissive electrode 117a and the reflective electrode 117b may be different according to a formation method, but they can be adjusted to have the same cell gap in terms of the overall area.

Further, an end portion of the transmissive electrode 117a and that of the reflective electrode 117b may contact each other to be electrically connected. In this instance, the electrodes 117a and 117b may contact each other in a different way such as by forming a contact hole. Also, for the contact portions of the transmissive electrode 117a and the reflective electrode 117b, one end of either the transmissive electrode 117a or the reflective electrode 117b may partially overlap with the other end of either the transmissive electrode 117a or the reflective electrode 117b.

In addition, a depressed pattern and a raised pattern may be formed at the reflective portion 117b to improve the reflection efficiency of light output after being made incident to the reflective portion (R) to thus improve the reflection luminance (reflective brightness). Further, the electrode may be formed with the above-described material in various ways. For example, the electrode may be formed through a physical/chemical vapor deposition method, a printing method, a coating method, or the like. In particular, the doped polyimide or the mixture of the transition metal complex and polyimide may be formed in a liquid phase, and the electrode may be formed at a low temperature through the process of printing or coating.

A description of an operation of the above-described LCD will now be given. That is, when an electric field is applied to the pixel electrodes 117a and 117b by the TFT 100, the liquid crystal layer 122 is aligned at a certain angle according to the applied voltage. Further, at the reflective portion (R), external light made incident is reflected by the reflective electrode 117b toward the second substrate 123, and at the transmissive portion (T), light generated from a backlight unit is transmitted toward the second substrate 123 through the transmissive electrode 117a.

Thus, the amounts of reflection and transmission are determined according to the degree of rotation of the liquid crystals, and an image appears on a liquid crystal panel according to the amounts of reflection and transmission. Further, at the reflective portions (R) in the transflective LCD, the light comes from the second substrate 123 to the first substrate 121 and is then reflected toward the second substrate 123. That is, the light passes through the liquid crystal layer 122 twice. Also, at the transmissive portion (T), the light comes from the backlight unit, passes through the first substrate 121, and then proceeds toward the second substrate 123. Namely, the light passes through the liquid crystal layer 122 once.

However, because the transmissive electrode 117a and the reflective electrode 117b are made of different materials and even though the same signal is applied to the pixel electrode 117 by the TFT 100, the substantial electric field applied to the liquid crystals is different at the transmissive portion (T)

and at the reflective portions (R). That is, because the light passing through the transmissive portion 117a and the light passing through the reflective electrode 117b have a different phase according to the rotation degree of the liquid crystal layer 122, the phase difference resulting from the difference in the length of the light path of the transmissive portion (T) and the reflective portions (R) is compensated. Thus, the light finally coming from the liquid crystal panel has the same phase at the transmissive portion (T) and at the reflective portions (R).

A method for fabricating the transflective LCD according to an embodiment of the present invention will now be described with reference to FIG. 3. In more detail, the transparent substrates 123 and 121 that face each other are first prepared. In addition, the substrates may include glass or crystal substrates 116 and 111, but a substrate made of another transparent material can also be used.

Further, the TFT 100 including the gate electrode 161, the active layer 162 having the semiconductor layer 162a and the ohmic-contact layer 162b, the source electrode 163 and the drain electrode 164 is formed on the substrate 121. That is, to form the TFT 100, a conductive material is first deposited on the entire surface of the substrate 121 and then patterned to form the gate electrode 161. Next, an insulation material is deposited on the entire upper surface of the substrate including the gate electrode 161 to form the gate insulating layer 160.

In addition, the semiconductor layer 162a made of amorphous silicon and the ohmic-contact layer 162b formed by doping impurities on amorphous silicon are successively deposited on the gate insulating layer 160 and then patterned to form the active layer 162 of the TFT. Thereafter, a metallic material is deposited on the entire surface of the ohmic-contact layer 162b and the gate insulating layer 160 and then patterned to form the source electrode 163 and the drain electrode 164. Subsequently, the passivation film 127 is formed on the substrate including the source electrode 163 and the drain electrode 164 and then patterned to expose a portion of the drain electrode 164 to form the contact hole 165.

Next, the transmissive electrode 117a made of a transparent conductive material is formed at the transmissive portion (T) of the pixel electrode 117a, and the reflective electrode 117b made of an opaque conductive material is formed at the reflective portion (R) of the pixel electrode 117b. Further, the reflective electrode 117b may include the depressed pattern and the raised pattern to increase the reflection efficiency of the light output after being made incident on the reflective portion, to thus improve the reflection luminance (reflective brightness).

Also, to form the depressed pattern and the raised pattern at the reflective electrode 117b, a depressed pattern and a raised pattern may be formed at the passivation layer 127 or a pattern for creating the depressed pattern and the raised pattern can be additionally formed on the passivation layer 127. In addition, the transmissive electrode 117a and the reflective electrode 117b can be formed using a physical vapor deposition method, a printing method, a coating method, etc. For example, the transparent conductive electrode 117a may be formed on the substrate through the physical vapor deposition method and then patterned such that the transmissive portion (T) remains. Thereafter, the reflective electrode 117b is formed at the reflective portion (R) according to the printing method.

In addition, the transmissive electrode 117a and the reflective electrode 117b are electrically connected, and thus are formed such that their sides contact each other or the end portion of the transmissive electrode 117a and that of the reflective electrode 117b overlap such that the electrodes 117a and 117b contact each other. Further, the reflective electrode 117b may be first formed, followed by forming the transmissive electrode 117a. Also, the reflective electrode 117b and the transmissive electrode 117a may be formed in various manners, and may be formed by changing the order of the reflective electrode 117b and the transmissive electrode 117a.

Also, as discussed above, in the LCD, the reflective portion and the transmissive portion of the pixel electrode have the same cell gap. Therefore, the phase of light transmitted through the liquid crystal layer on the reflective electrode is retarded by the reflective electrode 117b so as to be the same as the phase of light transmitted through the liquid crystal layer 122 on the transmissive electrode 117a.

Figure 4:
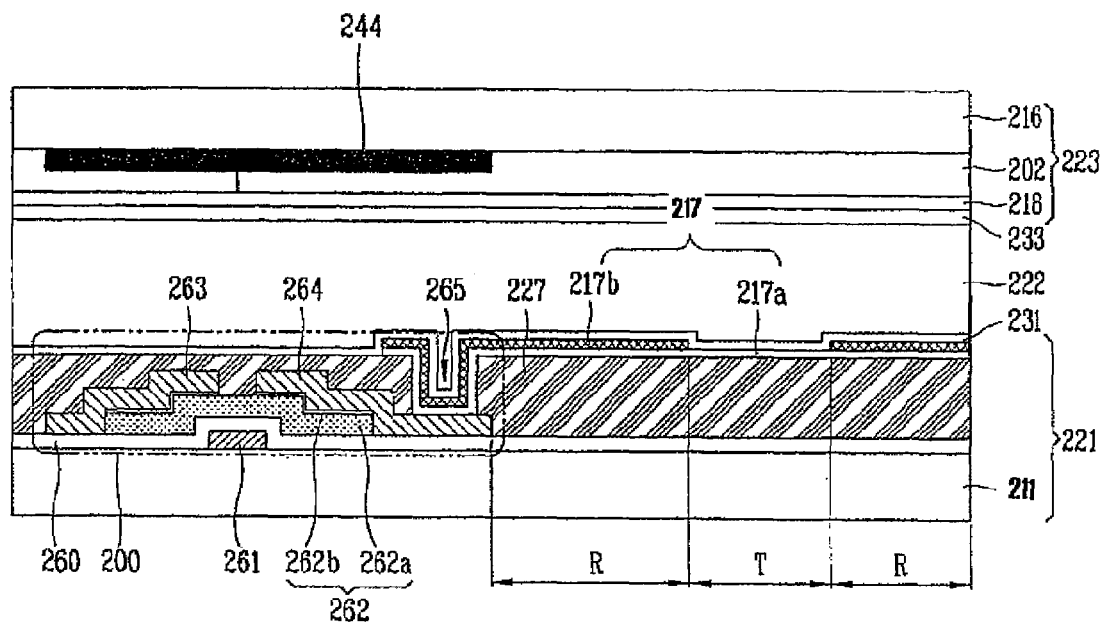
FIG. 4 is a sectional view of a transflective LCD according to a second embodiment of the present invention.

Next, FIG. 4 is a sectional view of a transflective LCD according to a second embodiment of the present invention. In this description, only the aspects of second embodiment that are different from the first embodiment of the present invention will be described. Note that in FIG. 4, the reference numerals are increased by 100 compared to the reference numerals used in FIG. 3. Thus, with reference to FIG. 4, the transflective LCD according to the second embodiment has a similar structure as that of the first embodiment of the present invention, except that a pixel electrode 217, namely, a transmissive electrode 217a and a reflective electrode 217b are formed to be different from those of the first embodiment of the present invention.

As shown in FIG. 4, a transparent conductive material is formed on the entire surface of the pixel area, and the reflective electrodes 217b made of an opaque conductive material are additionally formed on the reflective portion (R) of the pixel area. Namely, the transmissive electrode 217a is extendedly formed at the reflective portions (R). Accordingly, the transmissive portion (T) may be formed as a single layer of the transparent conductive material and the reflective electrodes 217b may have a dual-layer of the transparent conductive material and the opaque conductive material.

Further, in the second embodiment of the present invention, the thickness of the reflective portions (R) is larger than that of the transmissive part (T), so a cell gap of the reflective portions (R) and that of the transmissive portion (T) are slightly different. However, because the reflective portions (R) and the transmissive portion (T) are formed to be relatively thin compared with the cell gaps, there is not much difference between the cell gaps.

Thus, compared with the formation method of the first embodiment, the formation method according to the second embodiment is different only in the process of forming the pixel electrode 217. Therefore, only the method for forming the pixel electrode 217 will now be described. In more detail, to form the transparent transmissive electrode 217a, a conductive layer is formed on the entire surface of the pixel area.

The transmissive electrode 217a may be formed such that a transparent conductive layer is deposited on the entire surface of the pixel area and then patterned. Next, the reflective electrode 217b is formed as the opaque conductive layer. The reflective portion (R) can be also formed such that the reflective portion (R) is deposited and then patterned or printed depending on its material.

Also, after the transmissive electrode 217a and the reflective electrodes 217b are sequentially deposited on the entire surface, the electrodes 217a and 217b can be simultaneously patterned. That is, after the transmissive portion (T) or the reflective portion (R) is formed on the entire surface, the portions can be patterned to form the transmissive electrode 217a and the reflective electrodes 217b using a dry etching or wet etching process.

Figure 5:
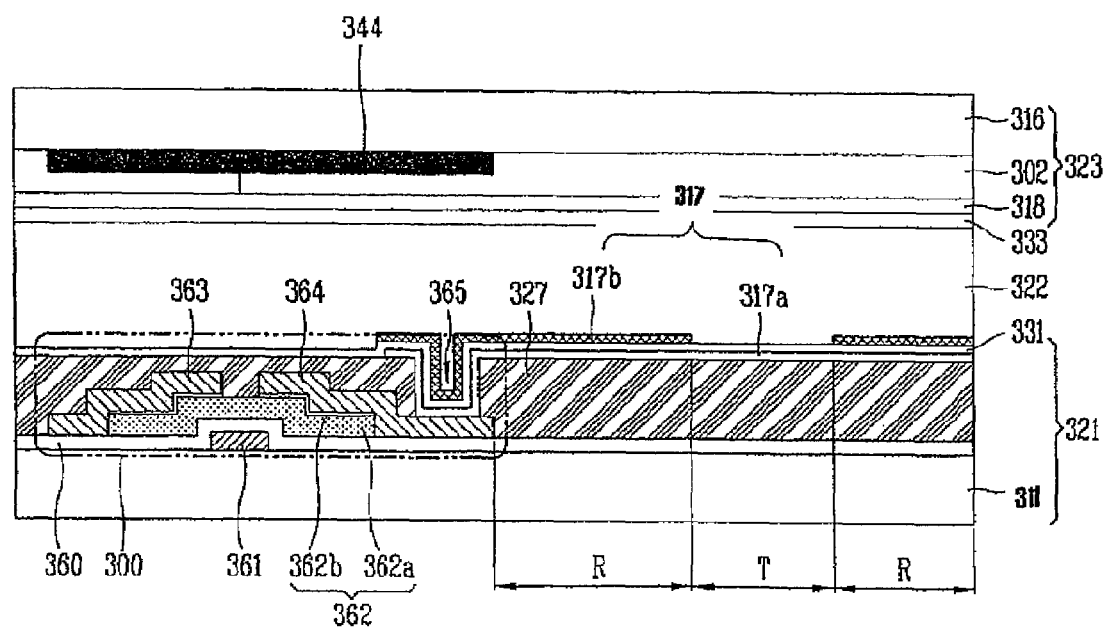
FIG. 5 is a sectional view of a transflective LCD according to a third embodiment of the present invention.

Next, FIG. 5 is a sectional view of a transflective LCD according to a third embodiment of the present invention. With reference to FIG. 5, the reflective LCD according to the third embodiment of the present invention has a similar structure as that of the first embodiment of the present invention. However, in the third embodiment, the reflective electrodes are configured as an alignment layer. Again, the reference numerals used in FIG. 5 are increased by 100 compared to the reference numerals used in FIG. 4.

In more detail, a transmissive electrode 317a made of a transparent conductive material is formed on the entire surface of the pixel area, and an alignment layer 331 is formed on the transmissive electrode 317a. Further, reflective electrodes 317b are formed on a region corresponding to reflective portions (R).

In addition, the reflective electrodes 317b are electrically connected with a drain electrode 364 of a TFT 300 so as to be simultaneously driven together with the transmissive electrode 317a. Also, the reflective electrodes 317b are connected with the transmissive electrode 317a and the drain electrode 364 via a contact hole 365. Further, if the reflective electrodes 317b are not connected with the drain electrode 365 via the contact hole, a signal from the drain electrode 364 of the TFT 300 may be transferred to the reflective electrodes 317b via a separate contact hole used to electrically connect the transmissive electrode 317a and the reflective electrodes 317b.

Thus, in this embodiment, the reflective electrodes 317b serve not only as a pixel electrode, but also as an alignment layer. Namely, by forming the reflective electrodes 317b with metal-doped polyimide or transmission metal complex-mixed polyimide, the electrodes 317b can be used as the alignment layer. That is, the reflective electrodes 317b can be used as the pixel electrode and also as the alignment layer that aligns the liquid crystal molecules. Accordingly, when the reflective electrodes 317b at the reflective portion (R) and the alignment layer 331 at the transmissive portion (T) undergo a rubbing process, the liquid crystal molecules can have a pretilt angle.

Further, in the third embodiment, to form the pixel electrodes 317a and 317b, a conductive layer is first formed on the entire surface of the pixel region and then patterned to form the transparent electrode 317a. Next, the alignment layer 331 is formed on the entire surface of a first substrate 321 including the transparent electrode 317a and then patterned to form the contact hole 365 for connecting the reflective electrodes 317b (to be formed later) and the transparent electrode 317a.

Next, an opaque conductive layer made of a conductive polymer material is formed on the alignment layer 331 and then patterned to form the reflective electrodes 317b. Finally, after a second substrate 323 is formed, the two substrates 321 and 323 are attached and the liquid crystal layer 322 is formed therebetween to complete the LCD.

In addition, the present invention is not limited to the above-described structure and methods. That is, the above-described structure is merely an example for explaining the present invention. For example, the LCD according to the present invention may be variably used as the reflective type, transmissive type or transflective type, and the transmissive and reflective electrodes of the pixel electrode may be formed in various manners.

In addition, various other liquid crystal driving methods can also be used in the present invention. Namely, various liquid crystal driving methods can be applicable to the transflective LCD such as a TN (Twisted Nematic) mode LCD, VA (Vertical Alignment) mode LCD, ECB (Electrically Controller Birefringence) mode LCD, an IPS (In Plane Switching) mode LCO, and the like.

As so far described, in embodiments of the present invention, because the cell gaps of the reflective and transmissive portions are the same, the contrast ratio or uniformity of images of the LCD is enhanced. In particular, the reflective and transmissive portions are formed each with a different electrode material to control a phase difference of light transmitted through the reflective and transmissive portions. Further, the reflective portion and the transmissive portion can be formed to have the same cell gap. Therefore, by solving the problem of the LCD having a dual-cell gap, the LCD according to the present invention has an excellent display quality.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device, comprising:
   first and second substrates that face each other;
   a liquid crystal layer interposed between the first and second substrates;
   a thin film transistor (TFT) formed on the first substrate; and
   a pixel electrode electrically connected with the TFT and including a reflective portion having a reflective electrode and a transmissive portion having a transmissive electrode, and the reflective portion and the transmissive portion of the pixel electrode have a same cell gap,
   wherein the reflective electrode is formed of an opaque conductive polymer material and the transmissive electrode is formed of a transparent conductive material,
   wherein the reflective electrode and the transmissive electrode of the pixel electrode are electrically connected together, and
   wherein the opaque conductive polymer material of the reflective electrode includes a polyimide with a metal doped thereon or a mixture of a transition metal complex including a polyimide and a transition metal ligand.

2. The device of claim 1, wherein the reflective electrode formed of the opaque conductive polymer material changes a phase of light transmitted through the liquid crystal layer on the reflective portion such that the phase of the light is the same as that of light transmitted through the liquid crystal layer on the transmissive portion.

3. The device of claim 1, wherein the ligand is an alkyl group-introduced triazole.

4. The device of claim 1, wherein the transmissive electrode includes indium tin oxide (ITO).

5. The device of claim 1, wherein the transmissive electrode is formed to extend to a lower portion of the reflective electrode such that the reflective electrode and the transmissive electrode are electrically connected together.

6. The device of claim 5, further comprising:
   an alignment layer formed between the transmissive electrode and the reflective electrode.

7. The device of claim 1, wherein the TFT comprises:
   a gate electrode formed on a transparent substrate;
   a gate insulating layer formed on the gate electrode;

a semiconductor layer formed on the gate insulating layer; and source and drain electrodes formed to be spaced apart on the semiconductor layer, wherein the pixel electrode is electrically connected with the drain electrode.

8. A liquid crystal display device, comprising:

first and second substrates that face each other;

a liquid crystal layer interposed between the first and second substrates;

a thin film transistor (TFT) formed on the first substrate;

a passivation layer on an entire surface of the first substrate including the TFT;

a contact hole within the passivation layer, wherein the contact hole exposes the TFT; and a pixel electrode on the passivation layer, wherein the pixel electrode is electrically connected with the TFT through the contact hole and includes a reflective portion having a reflective electrode and a transmissive portion having a transmissive electrode, and the reflective portion and the transmissive portion of the pixel electrode have a same cell gap, wherein the reflective electrode is formed of an opaque conductive polymer material and the transmissive electrode is formed of a transparent conductive material, wherein the reflective electrode and the transmissive electrode of the pixel electrode are electrically connected together, wherein an alignment layer is formed between the transmissive electrode and the reflective electrode, and wherein the reflective electrode is used as the pixel electrode and the alignment layer.

9. The device of claim 8, wherein the reflective electrode formed of the opaque conductive polymer material changes a phase of light transmitted through the liquid crystal layer on the reflective portion such that the phase of the light is the same as that of light transmitted through the liquid crystal layer on the transmissive portion.

10. The device of claim 8, wherein the opaque conductive polymer material of the reflective electrode includes a polyimide with metal doped thereon.

11. The device of claim 8, wherein the opaque conductive polymer material of the reflective electrode includes a mixture of a transition metal complex including polyimide and transition metal ligand.

12. A liquid crystal display device, comprising:

first and second substrates that face each other;

a liquid crystal layer interposed between the first and second substrates;

a thin film transistor (TFT) formed on the first substrate;

a passivation layer on the entire surface of the first substrate including the TFT;

a contact hole within the passivation layer, wherein the contact hole exposes the TFT;

a transmissive electrode on the passivation layer and connected with the TFT through the contact hole;

an alignment layer on the passivation layer including the transmissive electrode; and a reflective electrode on the alignment layer, wherein a pixel electrode includes the reflective electrode and the transmissive electrode, wherein a reflection portion includes the reflective electrode, the alignment layer and the transmissive electrode and a transmissive portion includes the alignment layer and the transmissive electrode, and the reflective portion and the transmissive portion of the pixel electrode have a same cell gap, wherein the reflective electrode is formed of an opaque conductive polymer material and the transmissive electrode is formed of a transparent conductive material, wherein the reflective electrode and the transmissive electrode of the pixel electrode are electrically connected together, and wherein the reflective electrode is used as the pixel electrode and the alignment layer.

13. The device of claim 12, wherein the reflective electrode formed of the opaque conductive polymer material changes a phase of light transmitted through the liquid crystal layer on the reflective portion such that the phase of the light is the same as that of light transmitted through the liquid crystal layer on the transmissive portion.

14. The device of claim 12, wherein the opaque conductive polymer material of the reflective electrode includes a polyimide with metal doped thereon.

15. The device of claim 12, wherein the opaque conductive polymer material of the reflective electrode includes a mixture of a transition metal complex including polyimide and transition metal ligand.

* * * * *